Aug. 22, 1933.　　　E. J. KEARNEY　　　1,923,935
MILLING MACHINE STRUCTURE
Filed March 26, 1930　　　3 Sheets-Sheet 1

INVENTOR
Edward J. Kearney
BY
Fred G. Parsons
ATTORNEY

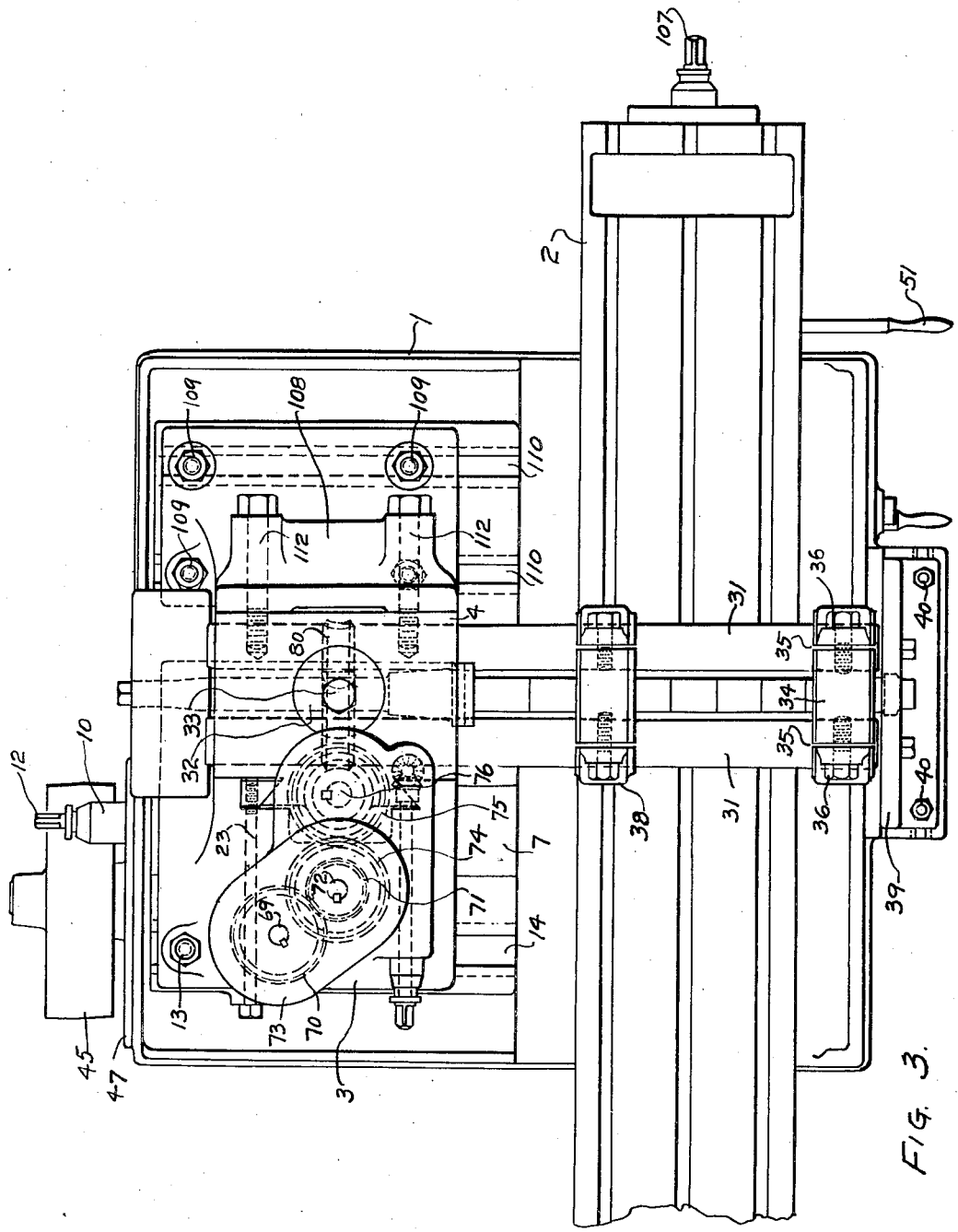

Patented Aug. 22, 1933

1,923,935

UNITED STATES PATENT OFFICE 1,923,935

MILLING MACHINE STRUCTURE

Edward J. Kearney, Wauwatosa, Wis., assignor to Kearney & Trecker Corporation, West Allis, Wis.

Application March 26, 1930. Serial No. 439,147

3 Claims. (Cl. 90—16)

Figure 1:
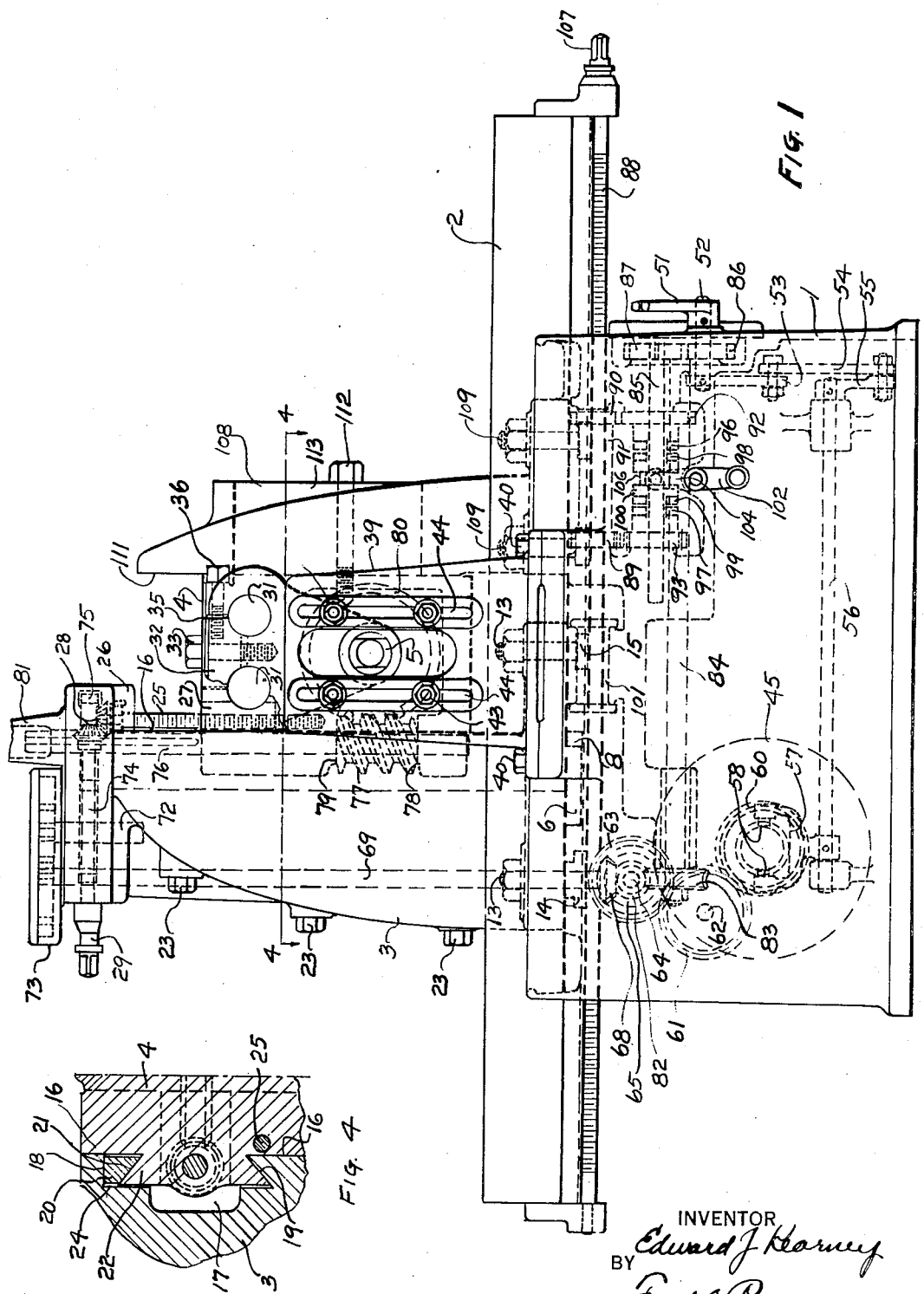
Figure 2:
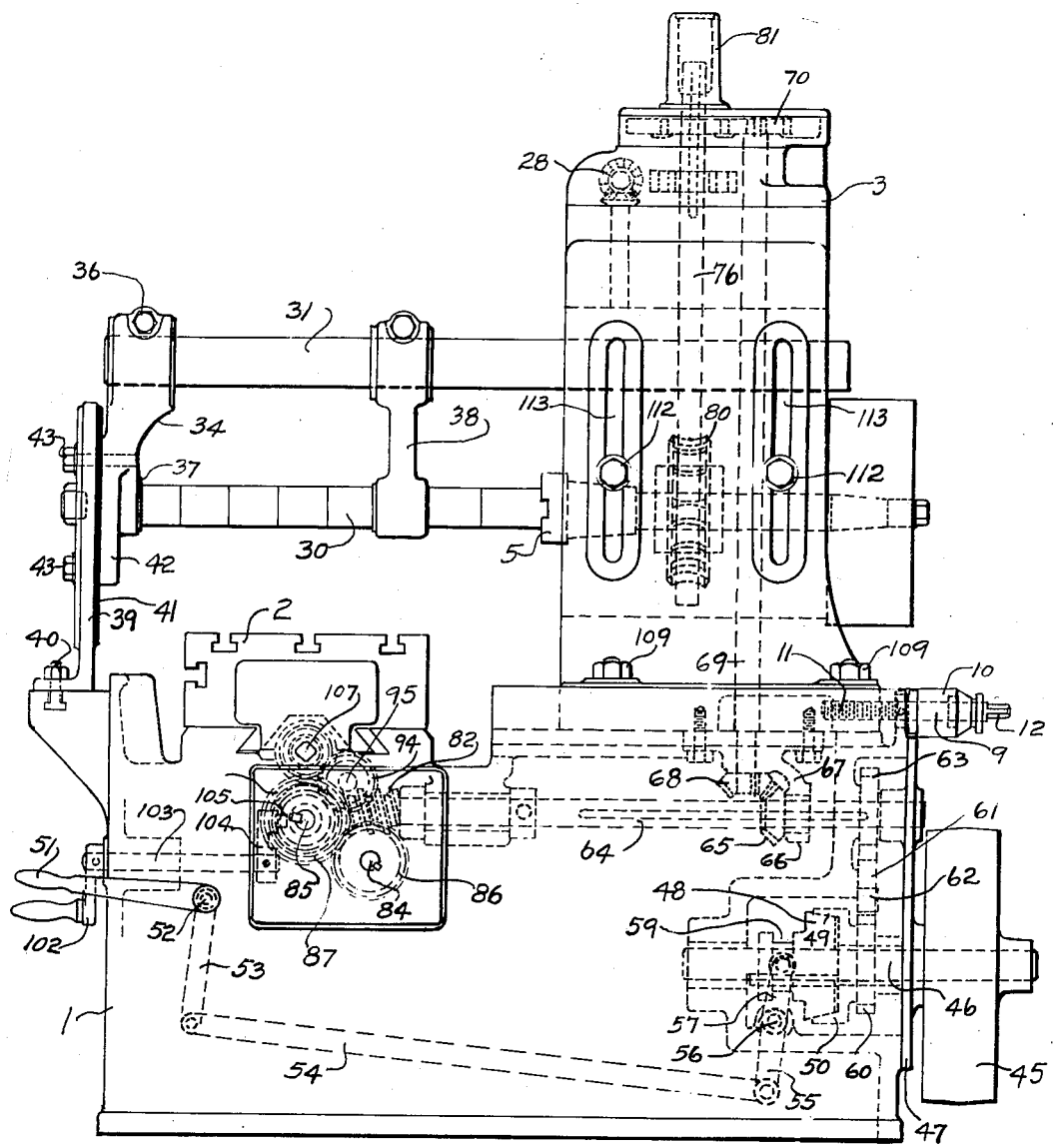

This invention relates to milling machines and one object is to provide a milling machine structure having increased rigidity over structures of the prior art. A further object is to provide a structure having improved accessibility. Another object is generally to improve and simplify the construction and operation of machines of this type and other objects will become apparent as the specification proceeds. These objects are accomplished in the manner described in the following specification and illustrated in the drawings accompanying the same, in which Fig. 1 is a front elevation of a milling machine embodying the invention, Fig. 2 is a right side elevation of the same machine, Fig. 3 is a plan view of the machine showing certain parts broken away, and Fig. 4 is a partial sectional view on the line 4—4 of Fig. 1. Like reference numerals refer to like parts throughout the drawings and specification.

Referring to the drawings, Fig. 1 shows a milling machine of the type having a bed 1, a reciprocating table 2, a head frame 3, a spindle carrier 4, vertically adjustable on the head frame and carrying a rotatable spindle 5. Head frame 3 is slidably mounted on the bed so that it can be adjusted in a direction at right angles to the path of travel of the table, and has a guide portion 6 extending downwardly into a groove 7, Fig. 3, in the bed. A gib 8 is fitted between the guide portion and one edge of the groove in the manner well understood in the construction of machines of this type.

Head frame 3 has a screw 9, Fig. 2, journaled in a bearing 10 fixed with bed 1 and fixed against axial movement and threaded in a nut portion 11 fixed with the head. Screw 9 may be turned to move the head manually by means of a suitable crank, not shown, applied to a squared end portion 12. Bolts 13—13 are provided, operating in slots 14 and 15 in the bed for clamping the head frame in any adjusted position. Slot 14 is made somewhat wider than slot 15 and extends through the top wall of the bed for the accommodation of the spindle driving means, to be described presently. The head frame 3 has a vertical face 16, a slot 17, Fig. 4, having an edge 18 in a plane perpendicular to face 16, and a re-entrant edge portion 19. A gib 20 is slidably mounted on the edge 18 and has a face 21 angular with respect to the edge 18 and so disposed as to provide with edge portion 19 space for the reception of a dovetail guide portion 22 fixed with carrier 4. Gib 20 is held in slot 17 by means of bolts 23—23 and a clearance space 24 is provided between the gib 20 and the slot 17. The spindle carrier 4 is mounted so as to be movable vertically against the face 16 of the head frame and has a guide portion 22 complementary to the slot 17 and fitting against the faces 19 and 21.

For vertical adjustment of the spindle carrier a screw 25 is provided, journaled and held against axial movement in a bearing 26 and threaded in a nut 27 fixed with the spindle carrier. Said screw is manually operable through bevel gears 28 and shaft 29. When the spindle carrier has been adjusted to the desired position by means of the screw 25, the bolts 23 can be tightened, thus drawing the gib against the guide portion 22 and clamping the spindle carrier firmly in position against the face 16 of the head frame.

A cutter arbor 30, Fig. 2, is fixed with spindle 5 and extends over table 2. A plurality of overarms 31—31 pass through bores in the spindle carrier and may be clamped therein by a clamping member 32 and bolt 33. Overarms 31 extend above the table and a pendant 34, slotted at 35—35, is clamped to the overarms by bolts 36—36. Pendant 34 has a bearing 37 adapted to support the outer end of cutter arbor 30, in well known manner, and another pendant 38 is provided intermediate pendant 34 and spindle carrier 4 for additional arbor support. A harness member 39 is secured on the bed of the machine by bolts 40—40 and has a vertical face 41 against which a portion 42 of pendant 34 may be secured by means of bolts 43—43 extending through slots 44—44 which are provided to allow for vertical movement of pendant 34 when spindle carrier 4 is adjusted.

Driving means for the spindle are provided as follows: A pulley 45 is adapted to be driven by a belt, not shown, and is mounted on a shaft 46 having suitable bearings in a member 47 and in bed 1. A clutch member 48 is slidably keyed to shaft 46 and has a conical friction face 49 for cooperating with a complementary clutch element 50 which is rotatably mounted on shaft 46. A lever 51, Figs. 1 and 2, is provided for movement of member 48. Lever 51 is fixed on a shaft 52 journaled in a wall of bed 1 and having on its inner end an arm 53. A link 54 is pivoted at one end to arm 53 and at its other end to an arm 55 which is fixed on a shaft 56, Fig. 1, journaled in suitable bearings in bed 1. Shaft 56 has at its end remote from arm 55 a fork member 57 having pins 58 engaging an annular groove 59 in clutch member 48. It will be apparent that movement of lever 51 up or down will, through the above connections, cause movement of clutch member 48 in or out, respectively, of engagement with clutch element 50. Clutch element 50 has fixed therewith a gear 60 meshing with a gear 61 rotatably mounted on a stud 62. Gear 61 in turn meshes with gear 63 which is fixed on a shaft 64 journaled in suitable bearings in the bed 1 and in member 47. It will thus be apparent that when clutch member 48 is out of engagement with clutch element 50, shaft 46 will turn freely in element 50, whereas when clutch member 48 is forced into engagement with clutch element 50 by lever 51, as above described, motion will be transmitted from member 48 to element 50 and from element 50 through gears 60, 61 and 63 to shaft 64.

A bevel gear 65 is slidably keyed to shaft 64 to permit adjustment of head frame 3 and has an extension 66 journaled in a bracket 67 mounted on the head frame 3 and extending downwardly into the bed 1 through the slot 14. A bevel gear 68 meshing with bevel gear 65 is fixed on a shaft 69 journaled in suitable bearings in the head frame 3. At its upper end shaft 69 has removably keyed thereto a gear 70, Fig. 3, meshing with a gear 71 which is removably keyed on a shaft 72. These two removable gears may be interchanged to produce different rates of speed in shaft 72. They may also be replaced by gears of different ratios when desired and thus constitute a rate changer by means of which different spindle speeds may be secured. A suitable housing 73 is provided for these gears. Shaft 72 has a gear 74 fixed thereon which drives a gear 75 in the bore of which a worm shaft 76 is slidably keyed and extends downwardly, as shown in Fig. 1, and has rigidly mounted thereon a worm 77. Worm 77 is restrained from axial movement relative to carrier 4 by bearing surfaces 78 and 79 and meshes with a worm gear 80 keyed to spindle 5. A housing 81 is provided to enclose the projecting end of worm shaft 76.

For movement of table 2 from pulley 45 there is provided the following mechanism:

The shaft 64, Figs. 1, 2, is driven from pulley 45, as previously described, and has fixed thereon a worm 82 meshing with a worm wheel 83 fixed on a shaft 84. Shaft 84 drives a shaft 85 through a rate changer consisting of different diametered gears 86—87 removably keyed on the shafts 84—85 and interchangeable between the shafts and also replaceable by other gear pairs of different rates. Shaft 85 drives a table screw 88, rotatably supported for translation with table 2, through a motion reverser consisting of a pair of gears 89—90 each fixed on a sleeve 91 co-axial with screw 88 and slidably keyed therewith to permit axial translation of the screw, a gear 92 rotatably supported on shaft 85 and directly meshed with gear 90, a gear 93 rotatably supported on shaft 85 and driving gear 89 through an idler gear 94 rotatably supported on a stud 95; the gears 92—93 being spaced apart and provided with clutch teeth 96—97 adapted for engagement by complementary clutch teeth 98—99 on opposite ends of a clutch member 100 slidably keyed on shaft 85. Member 100 when shifted in the one or the other direction will drive screw 88 in the one or the other direction and cause translation of the screw and table in a corresponding direction, the screw being in threaded engagement with a nut 101 fixed on bed 1. For shifting the member 100 there is provided a hand lever 102, Figs. 1–2, fixed on a shaft 103, upon which is also fixed a lever 104 having a portion 105 engaging an annular groove 106 in the member 100. Manual translation of the table may be accomplished by a suitable crank, not shown, applied to the squared portion 107 of screw 88.

Under normal operating conditions the head frame 3 provides ample support for carrier 4, in which case harness 39 may be removed to provide accessibility. Under other conditions the extra support provided by the harness 39 and overarms 31 is not sufficient. There is therefore provided another removable support or member 108 slidably mounted on the bed for adjustment in a path parallel to that of the head frame 3. Bolts 109—109 operate in suitable T-slots 110—110 in the bed to clamp the support 108 in its adjusted position. Member 108 has an upstanding portion and is provided with a vertical surface 111 adapted to seat against a corresponding surface on spindle carrier 4, against which member 108 may be rigidly clamped by the means of bolts 112—112 mounted in the spindle carrier and passing through slots 113—113 which permit the vertical movement of the carrier. It will be apparent that member 108 when in use may be adjusted to accommodate the position of adjustment of the head frame 3 and spindle carrier 4, and when in proper position the bolts 112 and 109 may be tightened, the arrangement providing a rigid support from bed 1 to carrier 4 in any carrier position, but completely removable when the extra support is not necessary.

It is to be understood that the foregoing description is for the purpose of illustration only, and that the invention is not to be taken as limited thereby or in any manner except as defined by the following claims.

What I claim is:

1. In a milling machine the combination of a bed, a head frame rigidly secured thereto, a spindle carrier adjustably supported from said head frame for bodily vertical movement with respect to said bed, clamp means for fixing said carrier with said head frame in various positions of said vertical movement, a work table horizontally reciprocably supported from said bed, a horizontal tool spindle rotatably supported from said carrier and axially transverse to the path of movement of said table, said head frame being at one side of the vertical plane passing through said spindle and normally adapted to completely support said carrier and spindle; an additional support for said spindle including a bodily removable member adapted to be fixed with said bed on the other side of said vertical plane and adapted to be fixed with said carrier in various positions of vertical movement thereof, clamp means for fixing said additional support with said carrier and operable independently of the first mentioned clamp means, and clamp means for fixing said additional support with said bed.

2. In a milling machine the combination of a bed, a work table horizontally reciprocably supported from said bed, a head frame supported from said bed for sliding adjustment transverse to the path of said table, clamp means for fixing said head frame in various positions of said adjustment, a spindle carrier supported from said head frame for vertical adjustment with respect to said bed, clamp means for fixing said carrier in various positions of said vertical adjustment, a horizontal tool spindle rotatably supported from said carrier and axially transverse to the path of movement of said table, said head frame being at one side of the vertical plane passing through said spindle and normally adapted to completely support said carrier and said spindle, an additional support for said spindle including a bodily removable member adapted to be fixed with said bed on the other side of said vertical plane, and clamp means adapted to fix said additional member with said carrier in various positions of vertical carrier movement and in various positions of adjustment of said head frame, the clamp means last mentioned being operable independently of both said head frame clamp means and of said carrier clamp means.

3. In a milling machine the combination of a bed, a work table reciprocably supported from said bed, a head frame rigidly secured to said bed, a spindle carrier adjustably supported from said head frame for bodily vertical movement with respect to said bed, clamp means for fixing said carrier with said head frame in various positions of said vertical movement, a horizontal tool spindle rotatably supported from said carrier and axially transverse to the path of movement of said table, said head frame being at one side of the vertical plane passing through said spindle and normally adapted to completely support said carrier and said spindle; and a plurality of additional supports for said spindle including a bodily removable member fixed with said bed on the said side of the table but on the other side of said vertical plane, clamp means for detachably connecting said member with said carrier in various positions of vertical adjustment of said carrier and operable independently of the first mentioned clamp means, a bodily removable member fixed with said bed on the other side of said table, an overarm projecting from and carried by said spindle carrier and adapted for vertical adjustment therewith, and clamp means for detachably connecting said last mentioned member with said overarm in various positions of vertical adjustment of said overarm and carrier, the last mentioned clamp means being operable independently of either of the other of said clamp means.

EDWARD J. KEARNEY.